Figure 1:
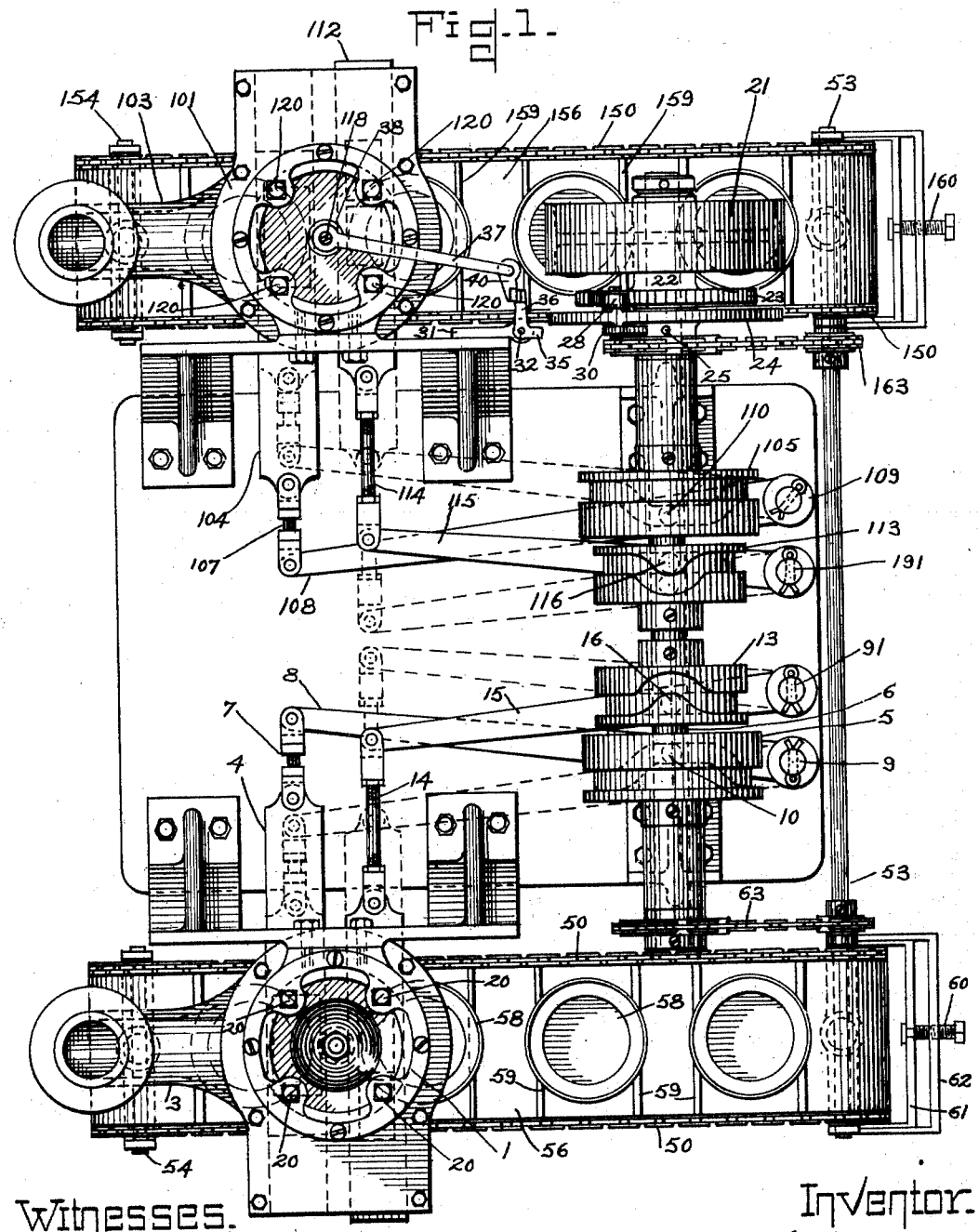

No. 760,162. PATENTED MAY 17, 1904.
H. SMITH.
AUTOMATIC MEASURING AND FILLING MACHINE.
APPLICATION FILED AUG. 19, 1903.
NO MODEL. 6 SHEETS—SHEET 1.

Witnesses.
M. H. Mellen.
R. Wallace.

Inventor.
Harry Smith
by Wm. A. Copeland
attorney

No. 760,162. PATENTED MAY 17, 1904.
H. SMITH.
AUTOMATIC MEASURING AND FILLING MACHINE.
APPLICATION FILED AUG. 19, 1903.
NO MODEL. 6 SHEETS—SHEET 2.

Witnesses
Robert Wallace.
M. H. Mellen.

Inventor.
Harry Smith
by Wm. A. Copeland
Attorney.

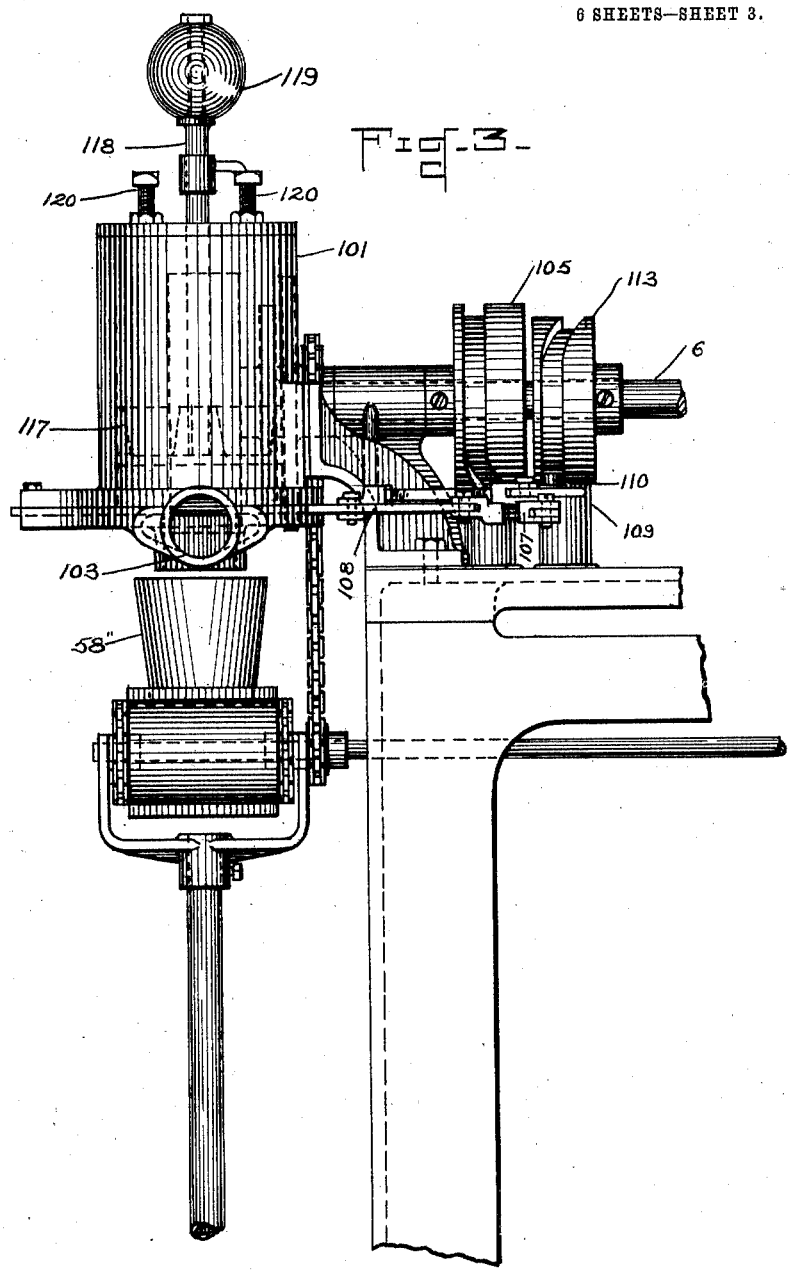

No. 760,162. PATENTED MAY 17, 1904.
H. SMITH.
AUTOMATIC MEASURING AND FILLING MACHINE.
APPLICATION FILED AUG. 19, 1903.
NO MODEL. 6 SHEETS—SHEET 4.
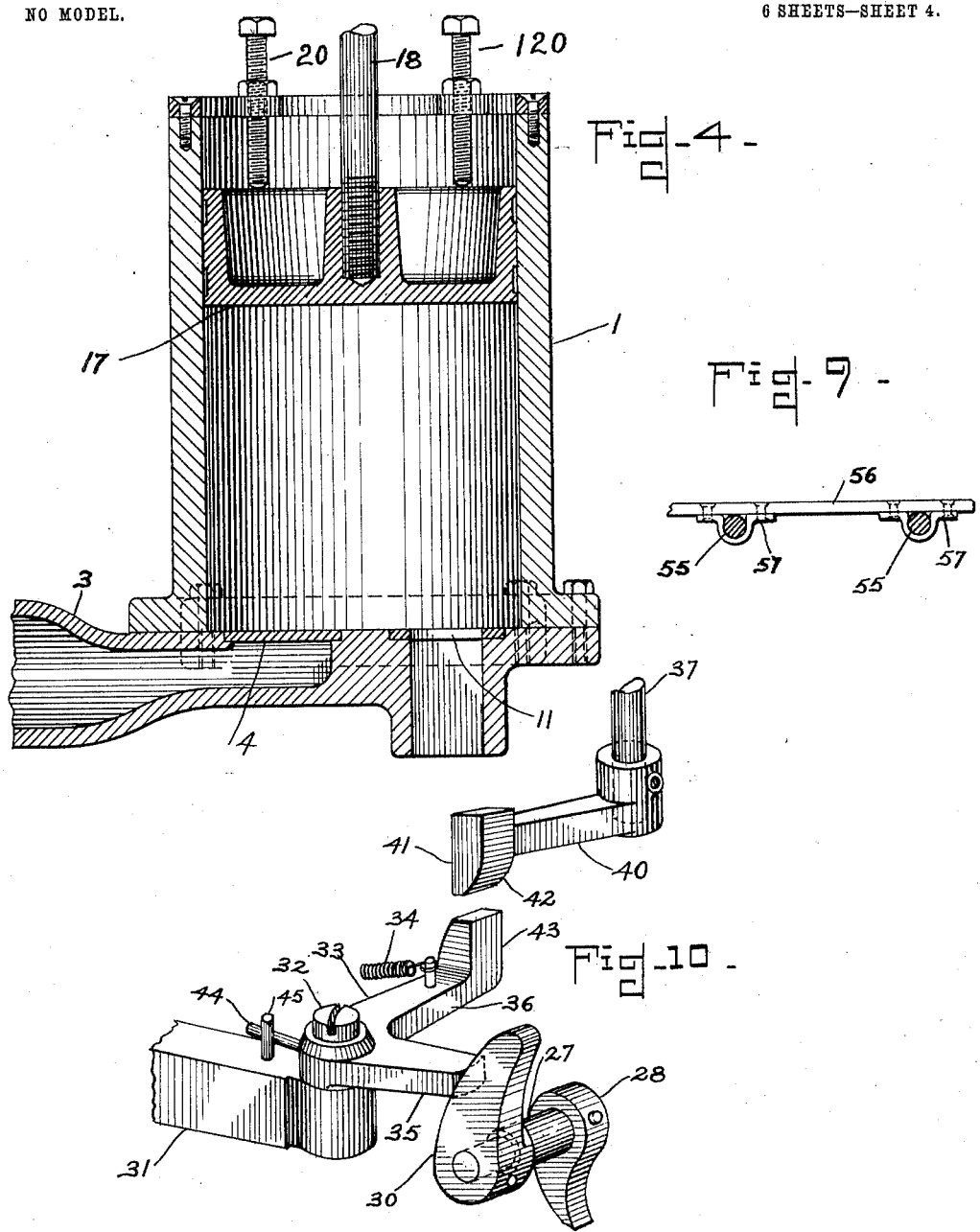
Witnesses
M. H. Mellen.
R. Wallace.
Inventor
Harry Smith
by Wm. A. Copeland
attorney.

No. 760,162. PATENTED MAY 17, 1904.
H. SMITH.
AUTOMATIC MEASURING AND FILLING MACHINE.
APPLICATION FILED AUG. 19, 1903.
NO MODEL. 6 SHEETS—SHEET 5.
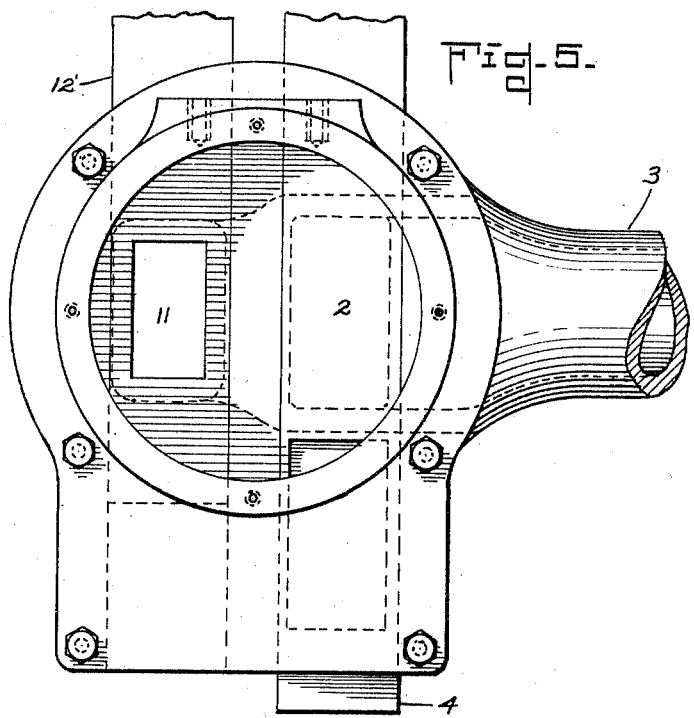
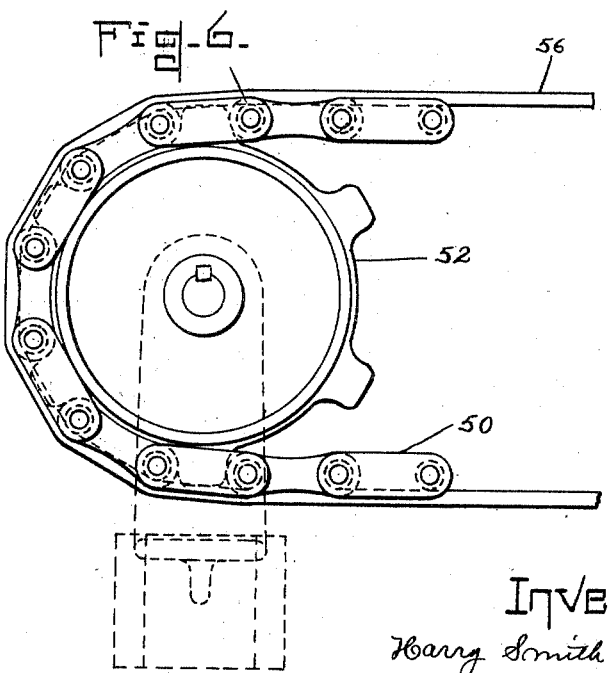

No. 760,162. PATENTED MAY 17, 1904.
H. SMITH.
AUTOMATIC MEASURING AND FILLING MACHINE.
APPLICATION FILED AUG. 19, 1903.
NO MODEL. 6 SHEETS—SHEET 6.
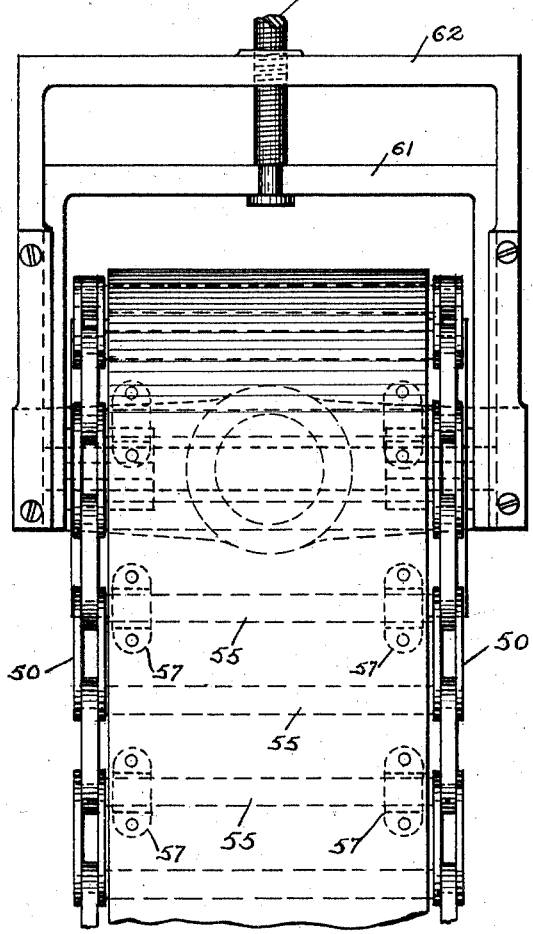
Fig-7-
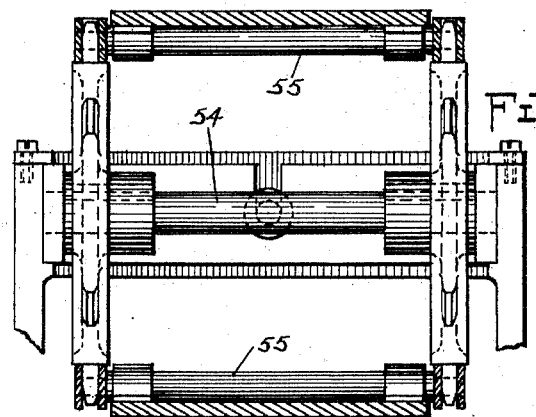
Fig-8-
Witnesses
M. H. Mellen.
R. Wallace.
Inventor
Harry Smith
by Wm A. Copeland
attorney.

No. 760,162. Patented May 17, 1904.

UNITED STATES PATENT OFFICE.

HARRY SMITH, OF BOSTON, MASSACHUSETTS, ASSIGNOR TO PNEUMATIC SCALE CORPORATION, OF BOSTON, MASSACHUSETTS, A CORPORATION OF MAINE.

AUTOMATIC MEASURING AND FILLING MACHINE.

SPECIFICATION forming part of Letters Patent No. 760,162, dated May 17, 1904.

Application filed August 19, 1903. Serial No. 169,979. (No model.)

*To all whom it may concern:*

Be it known that I, HARRY SMITH, of Boston, in the county of Suffolk and State of Massachusetts, have invented certain new and useful Improvements in Automatic Measuring and Filling Machines for Liquids and Semiliquids, of which the following is a specification.

The object of the invention is to produce a machine for automatically measuring out a predetermined quantity of liquid or semiliquid and discharging it into a receptacle which is automatically placed in position to receive the discharge and having mechanism which is automatically operated to remove the filled receptacle and place another empty one in position to be filled.

Another object of the invention is to combine two or more of said measuring and filling mechanisms in such manner that one will control the others.

In carrying out the invention there is provided a measuring-cylinder into which the material to be measured is introduced, said cylinder being provided with a piston which is raised by the pressure of the material to be measured and having means for regulating the extent of movement of the piston, thereby regulating the quantity of material that can be introduced into the cylinder at one measurement. It is also provided with means by which the supply will be cut off after a predetermined interval and open a discharge-valve, allowing the piston to descend, and mechanism actuated by the piston at the end of its descent to close the discharge-valve and again open the supply-valve. There is also provided can-carrying mechanism for bringing cans or other receptacles into position for being filled and removing them after being filled, said can-carrying mechanism being actuated or controlled by the same mechanism which controls the movement of the valves.

When two or more of the filling mechanisms are combined, they are made to fill simultaneously and also to discharge simultaneously, except that the discharge from the cylinder whose piston controls the joint operating mechanism is made slower than the discharges from the other cylinder or cylinders, so that there shall be an assurance of complete discharge from all the cylinders before the can-carrying mechanism and valve-operating mechanism start.

For convenience of description the word "can" will be used to designate the receptacle into which the measured quantity of material is discharged; but it will be understood as including any receptacle suitable to receive the material.

The invention will now be fully described by reference to the accompanying drawings, and the novel features thereof will be particularly pointed out in the claims at the close of the specification.

Figure 2:
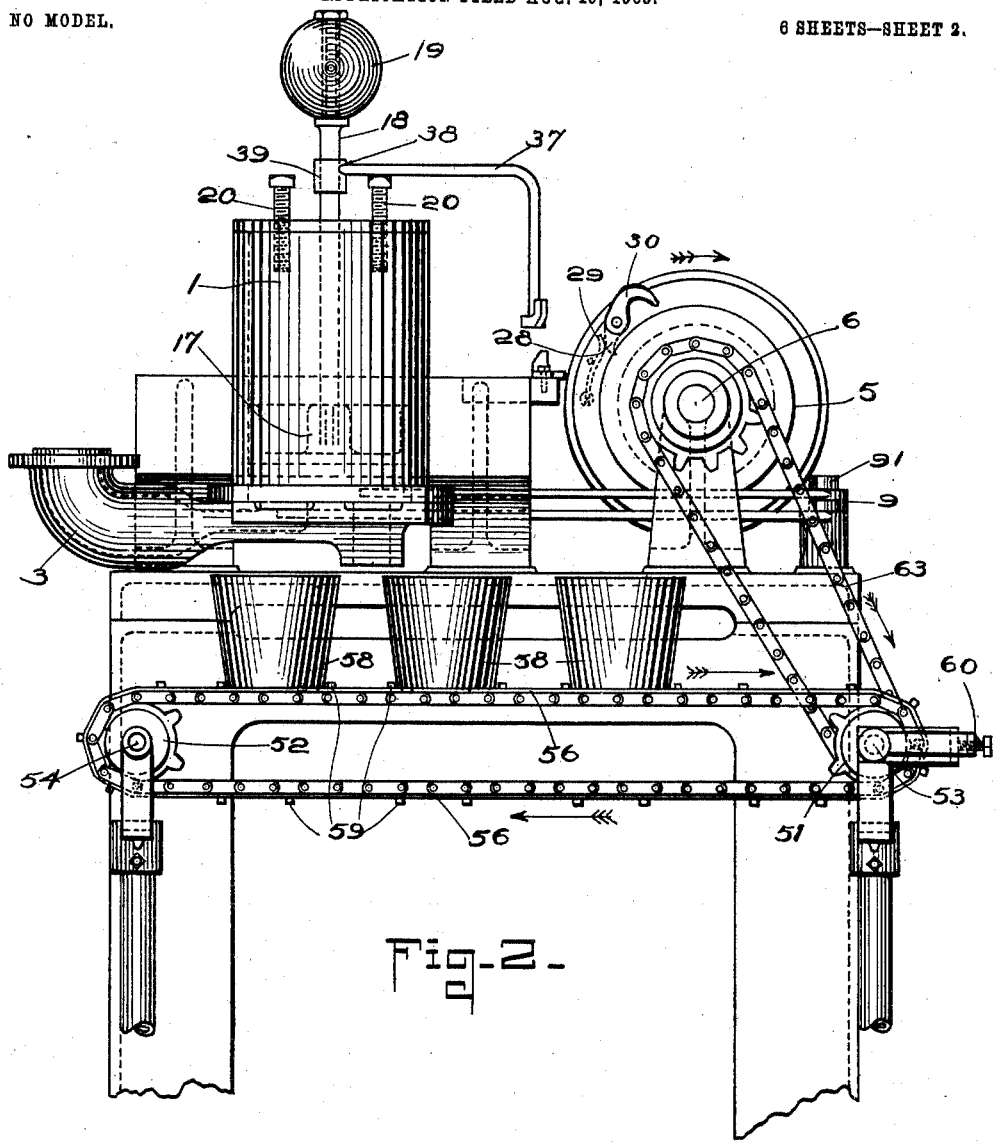

In the drawings, Figure 1 is a plan of a two-cylinder machine embodying the invention, the cylinders having just discharged and the supply-valves open, the discharge-valves closed, and the can-carrier in motion, and the piston partially raised. Fig. 2 is a side elevation of Fig. 1. Fig. 3 is a half-front elevation viewed from the left hand of Fig. 1. Fig. 4 is an enlarged vertical section of one of the cylinders with the piston elevated and ready to discharge, the supply-valve being closed and the discharge-valve open. Fig. 5 is a detail plan of one of the cylinders. Fig. 6 is a detail of the can-carrying belt broken away and its sprocket. Fig. 7 is a plan of the can-carrier. Fig. 8 is an end elevation of Fig. 7. Fig. 9 is a sectional detail on line 9 9 of Fig. 7, showing the means for fastening the belt to the chains so as to insure the simultaneous movement of chains and belt. Fig. 10 is a detail of the clutch-operating mechanism.

Referring now to the drawings, 1 and 101 represent the two cylinders, which are called the "measuring-cylinders," the piston of cylinder 101 controlling the joint operating mechanism.

The detailed description of one cylinder and its piston-operating connections will answer for a detail description of the other, except for the joint controlling mechanism connected with cylinder 101, which will be described separately.

As cylinder 1 is shown in more views than cylinder 101, the former will be described most in detail.

The cylinder is closed at the bottom except for the supply and discharge openings. It has in the bottom a supply-opening 2, leading from the supply-pipe 3, through which the material is introduced into the cylinder.

The admission from the supply-pipe is controlled by a slide-valve 4, which is actuated through intermediate mechanism by means of a cam 5 on driving-shaft 6. The intermediate mechanism shown consists of a link 7 and lever 8, pivoted to the stud 9, provided with a roller 10, which engages with cam 5. There is also in the bottom of the cylinder 1 a discharge-opening 11, controlled by a valve 12, which is actuated, through intermediate mechanism, by means of a cam 13 on shaft 6. The intermediate mechanism shown consists of a link 14 and lever 15, pivoted to stud 91 and provided with a roller 16, which engages with cam 13.

The cylinder 1 is provided with a piston 17, having a rod 18, on the upper end of which there is preferably a weight 19. The piston is raised by the upward pressure of the liquid when the material is being admitted into the cylinder, and the weight furnishes pressure to facilitate the descent of the piston and the discharge of the material when the discharge-valve is open. There are of course well-known equivalents for a weight, and the use of the term "weight" in the claims is intended to include such equivalents. Adjustable means are provided for limiting the height to which the piston can rise, whereby the quantity of material to be admitted to the cylinder can be regulated. The means shown consists of adjusting-screws 20, which pass down through the rim of the cylinder and impinge on the upper side of the piston.

Cylinder 101 is connected with supply-pipe 103 and is provided with supply-valve 104, operated by cam 105 on shaft 6 through link 107 and lever 108, pivoted to stud 109 and provided with roller 110. Cylinder 101 has a discharge-opening controlled by a valve 112, which is actuated by cam 113 on shaft 6 through link 114 and lever 115, pivoted to stud 191 and provided with roller 116, which engages with cam 113.

The cylinder 101 is provided with piston 117, having a rod 118 and weight 119 and adjusting-screws 120.

In order to control the time required for making the discharge, there should be provided means for varying the size of the outlet-passage. It is obvious that various means may be employed for thus varying the opening. The method which I have shown is to make the length of stroke of the slide-valve adjustable, so as to uncover more or less of the outlet from the cylinder. This is accomplished by making the links 7, 14, 107, and 114, which connect the valves with their cam-actuated levers, adjustable in length. The method shown for making the said links thus adjustable is to construct the link as a rod formed with right and left hand screw-threads at opposite ends which screw into tubular end connections, so that by turning the rod the link may be lengthened or shortened as desired.

The cams which actuate the supply-valves and the discharge-valves are all on the same shaft, and are so constructed and adjusted on the shaft that the times of opening and closing the supply-valves with relation to the opening and closing of the discharge-valves shall be fixed. The relative times for such opening and closing are so fixed that the discharge-valve will open after the supply-valve has closed and the discharge-valve will close before the supply-valve opens.

The opening and closing of each valve occurs once during each rotation of the shaft 6, and mechanism is provided by which the said shaft is made to rotate intermittently, stopping at the end of each rotation, and being automatically started again by the movement of the piston in one of the cylinders just as the discharge is completed. The mechanism for such intermittent and automatic action will now be described.

Mounted loosely on shaft 6 is a continuously-revolving driving-pulley 21. Fixed to the hub 22 of said pulley is a ratchet-wheel 23, which is also loose on said shaft. A disk 24, which will be termed the "pawl-carrier," is made fast to said shaft, as by a pin 25, through the hub of the disk or in any other suitable way. A shaft 27 passes loosely through the disk 24 near one edge thereof. (See Fig. 10.) On the end of the said shaft 27 there is fixed a pawl 28, which is adapted to engage with the teeth of ratchet 23, being normally held in engagement therewith by a spring 29. On the other end of said shaft 27 and on the opposite side of the disk from that on which the pawl is located is a finger 30, which will be referred to as the "pawl-finger." When the pawl 28 is in engagement with the ratchet 23, the shaft 6 will revolve, because the pulley 21 and ratchet 23 revolve continuously while the pulley is belted up and the power is on. Pivoted to a support 31 by a stud 32 is a bell-crank lever 33, which is normally held by a spring 34 in such position that the arm 35 will project into the path of movement of the pawl-finger 30, as shown in Fig. 10, and engage the pawl-finger at each revolution of the pawl-carrier disk 24, thereby tripping the pawl from the ratchet, so that the shaft 6 will come to a rest. The spring 34 is shown as a spiral spring, one end of which is connected to the arm 36 of said bell-crank, the other end being broken away, but is intended to be connected with the fixed support. Secured to the piston-rod 118 of piston 117 is a bent drop-arm or hanger 37.

It is preferable to secure the said arm to the rod by some means which permit of adjustment, as by a collar 38 and set-screw or other suitable means. Secured to the lower end of the drop-arm 37 is an arm 40, having a lug 41, formed with a bevel face 42, the arm 40 being so positioned that when the piston 117 has nearly completed its descent the bevel face 42 on said lug 41 will engage with a bevel-faced lug 43 on arm 36 of the bell-crank lever 33 and turn the said bell-crank on its pivot enough to disengage the end of arm 35 from the pawl-finger 30, thereby allowing the pawl 28 to respond to the pressure of its spring 29 and again engage with the ratchet 23 and cause the shaft 6 to again rotate. The adjustment of the drop-arm 37 and the cam-faced lug 41 on arm 40 is such that the reëngagement of the pawl with the ratchet will be so timed as to cause the shaft to start rotation just as the piston reaches the bottom of the cylinder, when the contents of the cylinder will have been completely discharged. A pin 44, projecting from bell-crank 33, engages with a stop-pin 45, projecting from the support 31 and limits the movement of the bell-crank, so that when pulled back by the spring 34 the arm 35 will be stopped and held in position to engage the pawl-finger.

The can-carrying mechanism and its operation will now be described, having special reference in the description to the mechanism connected with cylinder 1 for convenience of reference to the numerals on the drawings; but both can-carrying mechanisms are alike.

Two parallel sprocket-chains 50 50 are supported by and run on sprocket-wheels 51 51 and 52 52, mounted on shafts 53 54. The two chains 50 50 are tied together by shafts 55, which also form the rivets which connect the links of each chain together, and thus the two chains must move in unison. Carried by the cross ties or shafts 55 is the can-carrier belt 56. In order that the belt may be required to move in unison with the chains and not slip, it is secured by means of clips 57, which embrace the shafts and are riveted to the belt. It is not necessary to have the clips on every one of the shafts. In the drawings they are shown only on alternate shafts. In order that the cans or pails 58 may be spaced at equal and fixed distances apart, so as to bring a can beneath the discharge-opening at the end of each movement of the carrier, it is first determined just what distance is required to properly time it to the machine, and slats or bars 59 are secured to the belt transversely thereof at proper distances apart between which the cans are placed by the operator. The belt may be tightened by means of a screw-bolt 60, which connects the movable frame 61, in which the shaft 53 is journaled with the fixed frame 62.

The can-carrying mechanism coöperating with cylinder 101 has two chains 150 150, supported by and running on sprocket-wheels mounted on shafts 53 and 154. The chains are connected by shafts which carry the belt 156, secured to the shafts by clips, and the belt is provided with slats 159, as described with reference to the other can-carrier. There is also a belt-tightener 160, similar to the one already described. Shaft 53 is driven by means of sprocket-chains 63 and 163, running from sprocket-wheels on shaft 53 to sprocket-wheels on shaft 6, so that the can-carrier moves only when shaft 6 rotates. The operation of the machine is as follows, assuming the parts in the position shown in Figs. 1, 2, and 3, with the pistons starting up, the discharge-valves closed and supply-valves open and the can-carrier in motion, because the driving-pulley is clutched to the shaft 6 through the engagement of pawl 28 with the ratchet 23. During the movement of the can-carrier the cylinders are being filled. The speed of the can-carrier should be so timed with relation to the rapidity of flow of the material from the supply-pipes into the cylinders that sufficient time will be allowed for the cylinders to receive their full measure, to which the piston is adjusted before the shaft 6 completes its revolution far enough for the pawl to be tripped. The rise of the fluid in the cylinders will raise the pistons until they reach the full height allowed by the adjustment of the stop-screws 20 and 120, respectively. When the shaft 6 has revolved far enough to bring the pawl-finger 30 into engagement with the arm 35, the pawl 28 will be disengaged from the ratchet 23 in the manner already described, and the shaft 6 and can-carriers will be brought to a rest, the spacing of the cans on the belts being such that when the carriers come to a rest a can will be beneath the discharge-valve of each cylinder. The cam-grooves on the cams 13 and 113 are so formed also that levers 15 and 115 will be actuated to open the discharge-valves 12 and 112 after the pistons reach their highest point before the shaft 6 comes to a rest, and the supply-valves will be closed through the action of cams 5 and 105 on levers 8 and 108. The pistons now begin to descend as the fluid passes out of the cylinders. Just before the piston 117 reaches the bottom the lug 41 on arm 40 will engage lug 43 on arm 36 of the bell-crank lever 33 and turn the bell-crank lever to disengage arm 35 from the pawl-finger 30, and pawl 28 will be thrown by its spring 29 again into engagement with the ratchet 23, and the shaft 6 and can-carriers will again start. The curve in the grooves of cams 13 and 113 is made sharp, so that when the shaft 6 begins to move the levers 15 and 115 will be actuated to quickly close the discharge-valves, and the grooves in cams 5 and 105 are also made sharply curved, so as to quickly open the supply-valves. The cylinders will again be filled while the can-carriers are in motion.

While the measuring-receptacle shown in the drawings is cylindrical, the invention is not limited to use with a receptacle that is strictly cylindrical, and it is intended that the use of the word "cylinder" in the claims shall cover receptacles of any suitable form.

What I claim is—

1. In a measuring and filling machine for liquids and semiliquids, a measuring-cylinder having an inlet-valve and an outlet-valve, a piston which is raised by the upward pressure of the material beneath it in the measuring-cylinder and moves vertically downward while the measured material is being discharged, a weight which facilitates the descent of the piston, intermittently-moving can-carrying mechanism, and intermediate mechanism actuated by the piston in its vertically-downward movement to start the can-carrier, substantially as described.

2. In a measuring and filling machine for liquids and semiliquids, a measuring-cylinder having an inlet-valve and an outlet-valve, a piston which is raised by the upward pressure of the material beneath it in the measuring-cylinder and moves vertically downward while the measured material is being discharged, a weight which facilitates the descent of the piston, intermittently-moving can-carrying mechanism, driving mechanism, clutch connection between the can-carrying mechanism and the driving mechanism, and mechanism actuated by the piston during its descent to set the clutch into operative connection between the driving mechanism and the can-carrying mechanism, substantially as described.

3. In a measuring and filling machine for liquids and semiliquids, a measuring-cylinder having an inlet-valve and an outlet-valve, a piston which rises and falls with the material in the measuring-cylinder, intermittently-moving can-carrying mechanism, driving mechanism, clutch connection between the can-carrying mechanism and the driving mechanism, mechanism actuated by the piston in its descent to set the clutch into operative connection between the driving mechanism and the can-carrying mechanism, and mechanism which disengages the clutch and stops the can-carrier after a predetermined movement, substantially as described.

4. In a measuring and filling machine for liquids and semiliquids, a measuring-cylinder having an inlet-valve and an outlet-valve, a piston which rises and falls with the material in the cylinder, driving mechanism, an intermittently-rotating shaft having a clutch connection with said driving mechanism, mechanism actuated by the piston in its descent to set the clutch into operative connection between the driving mechanism and said shaft, mechanism which disengages the clutch at the end of each rotation of said shaft, can-carrying mechanism actuated by said intermittently-rotating shaft, and intermediate connections between said inlet and outlet valves and said shaft whereby the inlet-valve is opened and the discharge-valve is closed when the said shaft begins to rotate and the inlet-valve is closed and the outlet-valve is opened before the shaft completes its rotation, substantially as described.

5. In a measuring and filling machine for liquids and semiliquids, a measuring-cylinder having an inlet-valve and an outlet-valve, a piston which rises and falls with the material in the cylinder, can-carrying mechanism, intermittently-moving driving mechanism, and intermediate mechanisms between said intermittent driving mechanism and said valves and can-carrying mechanism whereby said intermittent driving mechanism controls the movement of said can-carrier and both of said valves, substantially as described.

6. In a measuring and filling machine for liquids and semiliquids, a fixed measuring-cylinder having movable inlet and outlet valves, a piston which rises and falls with the material in the cylinder, rotary driving mechanism, an intermittently-rotating shaft having a clutch connection with said driving mechanism, an arm carried by the said piston which in the descent of the piston causes the said clutch to make operative connection between the driving mechanism and the intermittently-rotating shaft, substantially as described.

7. In a measuring and filling machine for liquids and semiliquids, a measuring-cylinder having an inlet and an outlet valve, a piston which is raised by the influx of material in the cylinder and which falls with the exit of the material, a rotary shaft, a driving-wheel loose on said shaft and a ratchet-wheel fast to said driving-wheel and loose on said shaft, a disk fast to said shaft, a pawl journaled in the said disk having a spring which tends to hold said pawl in engagement with said ratchet whereby rotary movement will be given to said shaft, and having a finger projecting from the pawl-shaft, a pivoted stop-lever which normally projects into the path of said pawl-finger and disengages said pawl at the end of each revolution, an arm carried by said piston which when the piston reaches nearly the bottom of its descent engages said stop-lever and disengages it from said pawl-finger, allowing the pawl-spring to reëngage the pawl with the ratchet whereby the shaft is again rotated, and a spring which when the piston again rises and releases the stop-lever throws the stop-lever again into position to engage the pawl-finger, substantially as described.

8. In a machine for measuring and filling liquids, and semiliquids, a measuring-cylinder having inlet and outlet valves, a piston which is raised by the material rising in the cylinder and which descends with the discharge of the material, can-carrying mechanism, valve-operating mechanism, intermittently-moving mechanism which actuates both the can-carrying mechanism and the valve-operating mechanism, and mechanism controlled by said piston whereby the movement of the piston controls the movement of said intermittently-actuating mechanism and the valve-operating mechanism, substantially as described.

9. In a measuring and filling machine for liquids and semiliquids, a fixed measuring-cylinder having movable inlet and outlet valves, a piston which is raised by the influx of material into the said cylinder, intermittently-moving can-carrying mechanism and intermediate mechanism between the piston and can-carrier whereby the movement of the piston controls the movement of the can-carrier, substantially as described.

10. In a measuring and filling machine for liquids and semiliquids, a plurality of measuring-cylinders each having an inlet and an outlet valve, a piston in each cylinder which is raised by the influx of material, intermittently-moving can-carrying mechanism for each cylinder, and intermediate mechanism whereby the movement of one of the pistons controls the movement of all the can-carriers, substantially as described.

11. In a measuring and filling machine for liquids and semiliquids, a plurality of measuring-cylinders each having an inlet and an outlet valve, a piston in each cylinder which is raised by the influx of material, intermittently-moving can-carrying mechanism for each cylinder, and intermediate mechanism whereby the movement of one of the pistons controls the movement of all the can-carriers and all the valves, substantially as described.

12. In a measuring and filling machine for liquids and semiliquids, a plurality of measuring-cylinders each having an inlet and an outlet valve, a piston in each cylinder which is raised by the influx of material, intermittently-moving can-carrying mechanism for each cylinder and intermediate mechanism whereby the movement of one of the pistons controls the movement of all the can-carriers and all the valves, and driving mechanism common to all the can-carriers and valve-operating mechanisms, said driving mechanism being controlled by the movement of one of said pistons, substantially as described.

13. In a measuring and filling machine for liquids and semiliquids, a measuring-cylinder having an inlet and an outlet valve, intermittently-moving can-carrying mechanism, mechanism controlled by the discharge of the material from the cylinder which when the discharge is completed actuates the can-carrier to move, closes the discharge-valve and opens the inlet-valve whereby the inflow into the measuring-cylinder will take place while the can-carrier is in motion, and operating mechanism which is common to the can-carrier, inlet-valve and discharge-valve which opens the discharge-valve and closes the inlet-valve when the can-carrier stops, substantially as described.

In testimony whereof I have affixed my signature in presence of two witnesses.

HARRY SMITH.

Witnesses:
 WILLIAM A. COPELAND,
 ROBERT WALLACE.